Sept. 20, 1932.  D. K. HOPKINS  1,877,874
WELDING MACHINE
Filed Jan. 5, 1931   4 Sheets-Sheet 1

Inventor:
Durward K. Hopkins
By LaPorte & LaPorte Attys.

Sept. 20, 1932.  D. K. HOPKINS  1,877,874
WELDING MACHINE
Filed Jan. 5, 1931  4 Sheets-Sheet 3

Inventor:
Duryard K. Hopkins
By La Porte & La Porte Attys.

Patented Sept. 20, 1932

1,877,874

UNITED STATES PATENT OFFICE

DURWARD K. HOPKINS, OF PEORIA, ILLINOIS, ASSIGNOR TO W. E. KASTIEN AND J. F. JENKS, BOTH OF PEORIA, ILLINOIS

WELDING MACHINE

Application filed January 5, 1931. Serial No. 506,532.

This invention has reference to a machine for welding, preferably by electricity, metallic articles of various kinds and shapes, including wire, whether it be iron or steel, copper or special alloyed material; rods, bars, angles and the like, and it may be found equally useful for welding together other and various kinds and forms of metallic articles.

The invention relates particularly to a machine for butt-welding the ends of any such metallic articles; however, its design makes it peculiarly adaptable for use in establishments where articles are made of wire and especially will it be found useful in wire and wire fabric manufacture.

The invention has for its principal object to provide a welder of the character herein referred to, which includes sets of article gripping dies arranged for coacting and cooperative relation on the pieces of articles to be welded together; said dies arranged for actuation by means for setting the dies in relation to each other, in respect of the material to be welded, and for the opening and closing of the said dies whereby to grip the material to be welded, and further, in the provision of means for automatically moving one set of dies toward the other during the welding operation.

The invention has for an object, in one of its forms, to provide a welder of the character herein referred to, wherein there is included an indexing device for precise setting of the article gripping dies, having in mind various sizes, shapes or gauges of materials which the present designed or any modified machine may be capable of handling and welding, and including a movable member in association with one of the dies adapted to act on a limit switch for switching off the current just preceding the completion of the weld.

The invention has for a further object to provide a welding machine with sets of article gripping dies, one die of each set provided with graduated gripping elements or serrations to adapt the dies to articles or materials of different sizes, shapes or gauges and the adjacent surfaces of the said last mentioned die members of each set being oppositely inclined; whereby when such articles or materials are gripped thereby for welding, sufficient space is provided for the burrs formed as the result of the welding operation, while at the same time the grip of the dies on the articles or materials in relation to the fused ends thereof is sufficiently close to prevent irregular welds being formed during the welding.

A further object of the invention is to provide in a welding machine of the character herein referred to, and which is especially adapted for use in connection with the butt-welding of metallic articles and in particular wire, of either iron or steel, wherein is included an indexing device for spacing the article gripping dies in proper relation for the gripping and holding of iron or steel wires of different gauges, whereby to insure that the ends of the wires to be butt-welded shall extend from their respective dies a distance approximately equal to their diameter. Such precision in the setting of the dies, not only provides for mechanically and predeterminately setting them for the respective gauges of wire to be butt-welded, but also removes the human element and insures a perfect butt-weld on different gauges of such wires, by the same machine.

The invention has for a still further object to provide in a welding machine of the character herein referred to, means for setting the dies to adapt them to the butt-welding of articles of different sizes, shapes and gauges, and in the inclusion of a feeding means for bringing the ends of the articles together during their fusion, said feeding means comprising preferably a spring under tension in association with an indexing device, the tension of which is controlled by the movement of said indexing device.

Since the invention, as a welding machine, is adapted for use in the butt-welding of like articles but of varying shapes and sizes and useful in connection with the welding of ferrous and non-ferrous metals, it is capable of modification of the means for spacing of the sets of dies in their relation to each other, and, therefore, such spacing means may include or be associated with an indexing device for predeterminately spacing the dies in their relation to each other and form a part of or in immediate association with another indexing device by which is determined the tension which will move one set of dies in relation to the other during the fusion resulting from the welding operation; or such indexing device used in the spacing of the dies may be located apart from the tension setting index and associated in immediate relation with the means for moving the sets of dies apart and also employed for opening the dies; or the index by which the spacing of the dies is determined may be omitted and the machine constructed with the tension setting index and the extent of spacing of the sets of dies apart left to the determination of the operator.

Other and further objects will more fully appear from the following description.

Realizing that the present invention may be embodied in structures other than those disclosed herein, it is to be understood that the said disclosure is illustrative and not to be considered in the limiting sense.

This application is a continuation in part of the application filed by me on the 24th day of June, 1929, bearing Serial No. 373,227.

That the invention may be more fully understood, reference is had to the drawings forming part of this description, illustrating a preferred embodiment of the invention, in which.

Like characters of reference denote corresponding parts throughout the figures.

In the drawings a suitable support 1 may be provided for the welder and it may take the form of a portable stand or be a housing or casing of any suitable construction, suitable for containing elements included in the electrical equipment for energizing the dies for welding. Included in such equipment would be the primary and secondary coils $a$ and $b$, see Fig. 11, and also a switch H, about which and the said coils, more will be said later.

Figures 6, 7, 8:
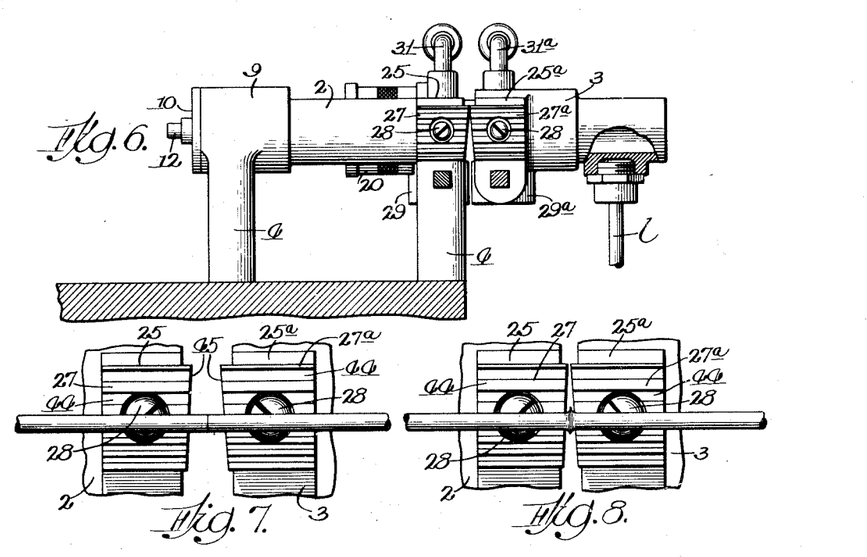
Fig. 6 is what may be termed an elevation of the die side of the machine, parts in section and parts being broken away.
Fig. 7 is a detail view of certain of the die members of each set, their positions corresponding to the position of similar parts in Fig. 3.
Fig. 8 is a view similar to Fig. 7 and of similar parts, but their positions correspond to the position of similar parts in Fig. 2.

The welder proper preferably comprises the two castings 2 and 3, the former being immovably supported by rests 4 on the support 1, see Fig. 6, and the latter is supported in movable relation with the casting 2, whereby it may be moved away from and toward the said casting 2. The plan and sectional views in Figs. 1 and 2 and the cross-sectional view in Fig. 4 will give a somewhat clear idea of the shape and contour of the welder and the space it would ordinarily occupy.

The casting 2 consists essentially of an elongated member provided with spaced parallel arranged tubular portions 5 and 6, functioning in effect as stationary sleeves in which shafts or spindles 7 and 8 may have a telescopic relation. At what may be termed the outer end of the casting 2, the tubular portions 5 and 6 terminate in and communicate with a housing 9 containing certain switch elements, to be further referred to, and a removable closure 10 for the said housing provides an easy and convenient means of access to the said housing. The said closure is provided with an opening 11 therethrough in which operates a push button 12, arranged for the manual operation by an attendant for the actuation of certain of aforementioned switch elements.

Figure 2:
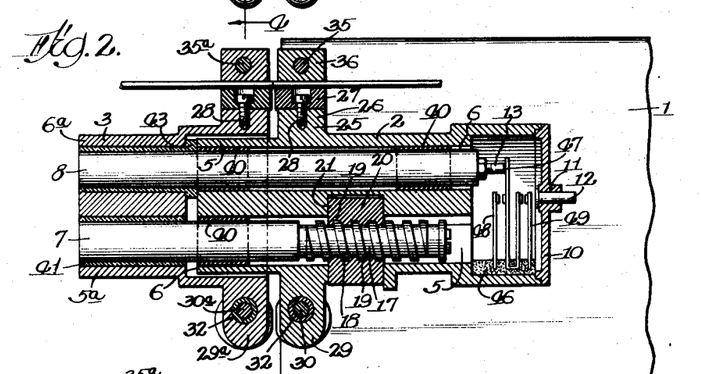
Fig. 2 is a horizontal sectional view in plan, of what is shown in Fig. 1.
Figure 3:
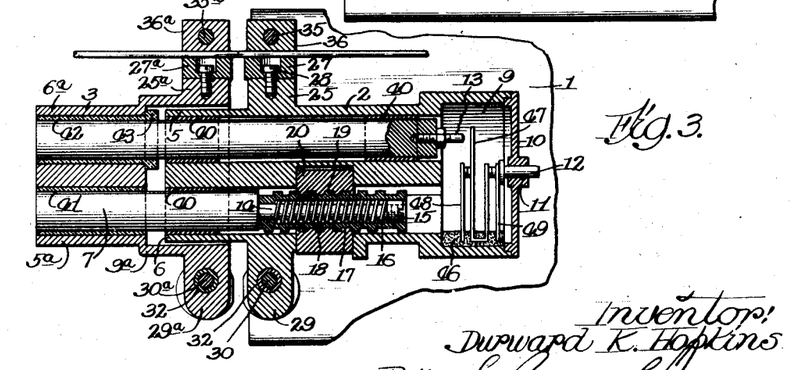
Fig. 3 is a sectional view, somewhat similar to Fig. 2, except that whereas in Fig. 2 the welding operation on the ends of abutting articles has been completed, in Fig. 3, the parts are in position where the articles have been gripped but the welding action has not been started.

The shaft or spindle 8 normally extends through the tubular portion 6, with one end projecting slightly into the housing 9, see Fig. 2, and to this end of said shaft or spindle is connected an axially adjustable contact point 13, see Fig. 3, which is designed to be moved into and out of contact relation with a certain switch element. The opposite end of the said shaft or spindle 8 projects a suitable distance beyond the inner end of the casting 2, see Figs. 2 and 3.

Figure 1:
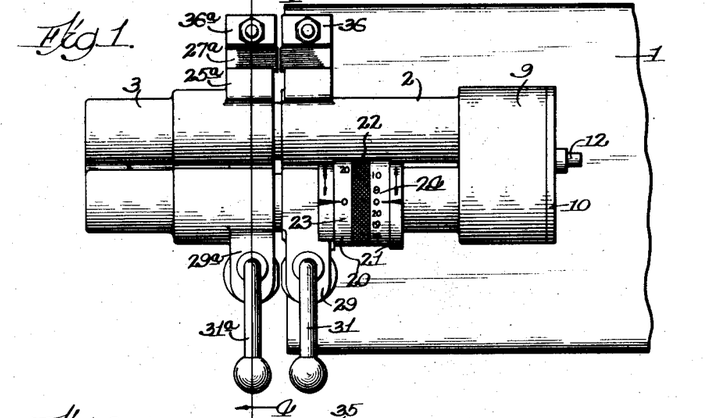
Fig. 1 is a plan view of one form of butt-welder.
Figures 10, 11:
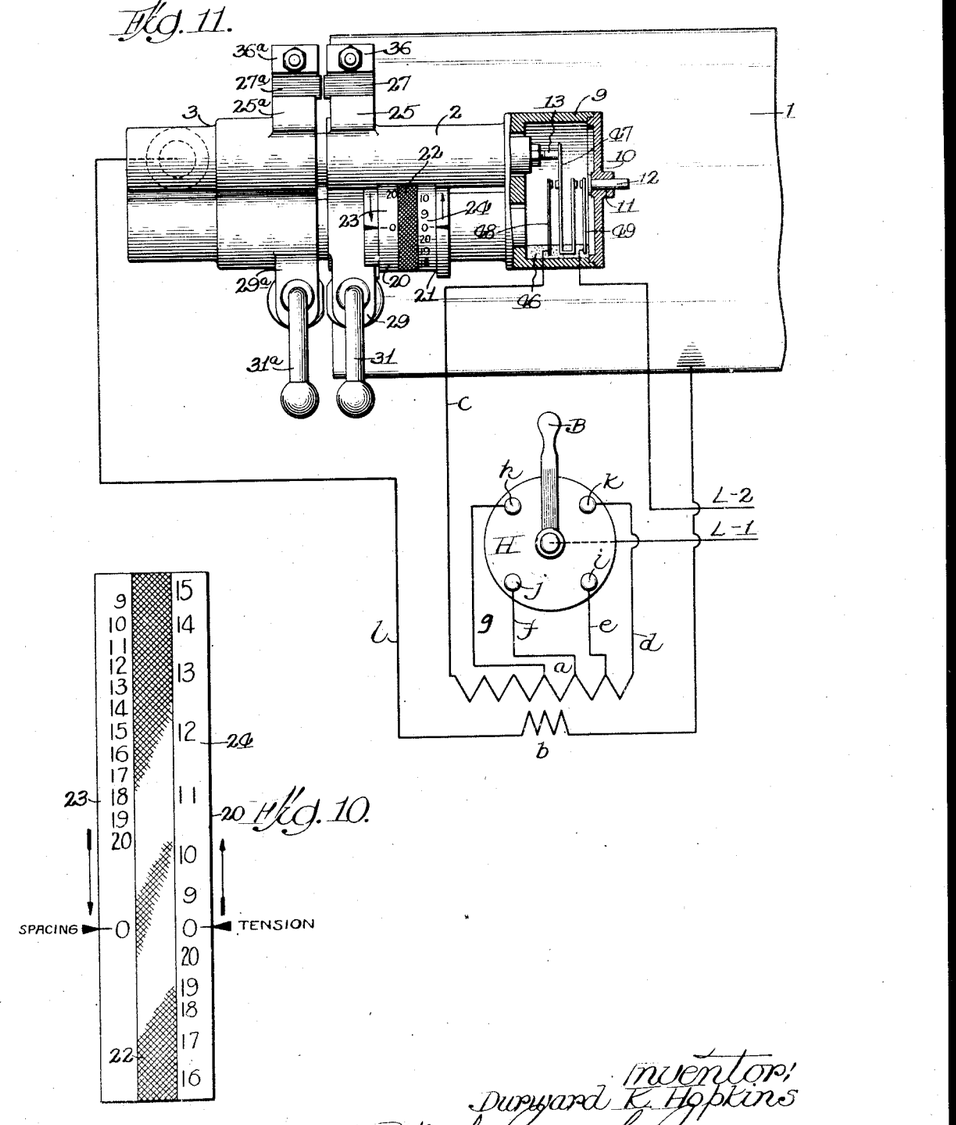
Fig. 10 is a diagrammatic view of one of the forms of the indexing device.
Fig. 11 is a plan view of the welder, somewhat as shown in Fig. 1 with switch members exposed and a diagrammatic outline of the control switch and wiring to effectively heat and to control the current to and through the dies.

The shaft or spindle 7 is somewhat shorter in length than the shaft or spindle 8, see Figs. 2 and 3, and it extends part way into the tubular portion 5, maintaining its full diameter for only a portion of its length in the said casting 2 and has a reduced elongated stem portion 14, see Fig. 3, which terminates short of the housing 9 and has threaded for adjustment thereon, the head 15. On said stem, between the head 15 and said shaft or spindle 7, is a coil spring 16, see Fig. 3. The said spring being housed within a sleeve 17 carried on said stem and normally abutting with the shoulder of the shaft or spindle 7, provided by the reduced stem and said shaft and said spring bears against the inner end of said sleeve, as shown. The sleeve is adapted for axial movement on the stem, in opposite directions, and therefore has movement on the head 15, as will be apparent from an examination of Fig. 3. The sleeve exteriorly, is provided with a thread 18 resembling a worm, and this thread has a meshing relation with a corresponding thread 19 arranged interiorly of what I choose to designate a dial-barrel 20 which, as shown, is seated and manually rotatable within a cut-out portion 21 of the casting 2. Centrally of this barrel and arranged circumferentially and exteriorly thereof, is a knurled surface 22 to provide means for fingering the barrel to rotate it in opposite directions, and on opposite sides of this knurled surface in one of the forms of the device and also disposed circumferentially of the barrel, are indexes 23 and 24, about which more will be said later. This barrel, with its knurled surfaces is best seen in Figs. 1 and 11, and the indexes somewhat better shown diagrammatically in Fig. 10.

Figure 4:
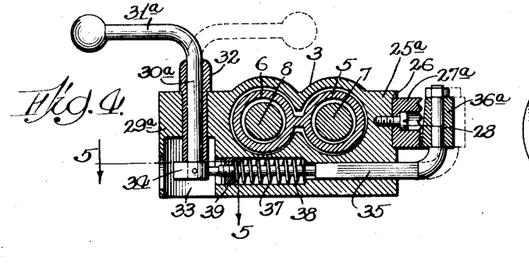
Fig. 4 is a detail in cross section, as the same would appear if taken on the line 4—4, Fig. 1.
Figure 5:
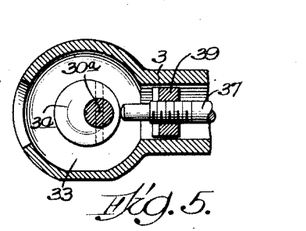
Fig. 5 is a detail in cross section, as the same would appear if taken on the line 5—5, Fig. 4.
Figure 9:
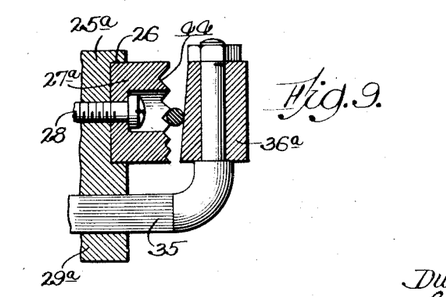
Fig. 9 is a sectional detail of the die structure shown in Fig. 4, but engaging and holding, as, for example, a wire therebetween.

The said casting 2, on one side and removed a suitable distance from the inner end thereof, is formed or provided with an off-set or projection 25 in which a recess 26 is provided, see Fig. 4, and in said recess is seated a die member 27 which is secured, preferably, by means of a screw 28 inserted into the die and threaded into said off-set or projection, see Figs. 2, 3 and 9, also shown in face view in Figs. 6, 7 and 8. The opposite side of said casting 2 and aligned with the off-set or projection 25, is also formed or provided with an off-set or projection 29, see Figs. 2 and 3, and disposed therein and in a position, preferably transversely to the axis of the shafts or spindles 7 and 8, is an operator's rod 30 bent at right angles to provide a finger-grip or handhold 31 for the manual turning of said rod, as illustrated by the full and dotted line showing in Fig. 4. The body of this rod has a bearing in a bushing 32 secured in the housing 2 and the inner and lower end of said rod 30 terminates in a chamber 33 in the said housing, which is sufficiently large to accommodate a cam 34 which is rotated on turning the rod 30, as will be understood. Held in contact with the surface of the cam is the end of a bar or rod 35 slidable transversely in the housing 2 with one end projecting without the housing below the off-set or projection 25 and said rod or bar upturned in front of but spaced outwardly from said off-set or projection 25 to accommodate the carrying of a die member 36 thereon, which is adapted to have a coacting relation with the die member 27 previously described, for engaging and holding the article or piece of material to be welded, therebetween, see Figs. 2, 3, 4 and 9. I prefer that the die member 36 is movable about the upturned portion of the bar or rod 35 to facilitate in the efficient gripping of the article or piece of material therebetween and the said die member 27. As shown in Fig. 4, the main body portion of the bar or rod 35 is square to prevent its turning, while at the same time permitting longitudinal movement thereof under the influence of the cam 34 and rod 30, and said rod or bar has a reduced stem portion 37, see Fig. 4, on which is carried a coil spring 38, one end bearing against a shouldered recess in the housing 2 and its opposite end bearing against a nut 39 threaded for adjustment on the stem portion 37 of said bar or rod 35 and which also serves as a bearing for the inner end of said bar or rod. It should be obvious that the bar or rod 35 is moved in one direction to separate the die member 36 from the die member 27 to permit the placement of an article or piece of material therebetween, on the turning of the rod 30 from the full line to the dotted line position shown in Fig. 4, and that when said rod is turned back to the full line position, that the spring 38 acts to move the die member 36 into coacting relation with the die member 27 and to firmly hold the same in such position. The tension of the spring 38 may be adjusted by adjusting the nut 39 and said nut and said housing are constructed and arranged, as shown in Fig. 5, to allow for this adjustment, by the application of a suitable tool to the said nut.

Preferably bronze bushings 40 in spaced relation in the tubular portion 6 of the housing 2 provide bearings at opposite ends of said housing, for the shaft or spindle 8 and a similar bushing 40 and the dial-barrel 20 in the tubular portion 5 provide the necessary bearings for the shaft or spindle 7.

The casting 3 has many of the characteristics of the casting 2, as is clear from an examination and comparison of the two castings, except that the casting 3 is somewhat shorter than the casting 2 and is telescopically movable thereon. The casting 3 is also a member provided with spaced parallel arranged tubular portions 5ª and 6ª, which, at their inner ends, merge into a housing portion 9ª, which surrounds the inner end of the casting 2 and said tubular portions 5 and 6, as is clearly seen in Figs. 2 and 3. The exposed ends of the shafts or spindles 7 and 8 extend into the tubular portions 5ª and 6ª, respectively, preferably terminating flush with the outer end of the casting 3. The said shafts or spindles 7 and 8 are preferably pressed into insulator bushings 41 and 42, respectively, which are secured in the tubular portions 5ª and 6ª and the inner end of said bushing 42 is formed or provided with a shouldered head 43 forming a stop and adapted to have an abutting relation with the end of the casting 2 when the casting 3 is at the limit of its inward movement on the casting 2. The housing 9ª of the casting 3 and the casting itself is always out of metal to metal contact with the casting 2, and with the shafts or spindles 7 and 8, and, therefore, are insulated apart as will be seen from an examination of Figs. 2 and 3 which show the casting 3 in its two extreme inner and outer positions in relation to the casting 2.

The said casting 3 at its inner end and on opposite sides, corresponding to the sides of the casting 2 where are located or positioned the off-sets or projections 25 and 29, respectively, is provided with off-sets or projections 25ª and 29ª, respectively, which have similar purposes to those off-sets or projections designated 25 and 29. The said off-set or projection 25ª is formed or provided with a recess, not shown, like that designated 26 and in said recess is seated a die member 27ª, secured in similar manner as the die member 27. There is also operatively connected with the off-set or projection 29ª an operator's rod 30ª having a finger-grip or handhold 31ª, and there is provided in association with said rod 30ª a duplicate of the operating parts disclosed in Fig. 4, in connection with the operator's rod 30 and which has been previously described, including the upturned end of a bar or rod 35ª which carries a die member 36ª similar to the die member 36 and movable about said bar or rod in like manner as said die member 36 to facilitate in the efficient gripping of the article or piece of material, to be welded, therebetween and the said member 27ª.

It will be observed, that the castings 2 and 3 are so fitted together and the operating parts so enclosed that acid fumes, as well as grit and dirt cannot interfere with the efficient operation of the machine.

Referring further to the dial-barrel 20 on which is arranged the indexes 23 and 24, such barrel is adapted for rotation in opposite directions, as indicated by the arrows in Figs. 1 and 10. The left hand index, looking both at Fig. 1 and also Fig. 10, is designated as the "spacing" index and the right hand index, looking at the same figures, is designated as the "tension" index. By turning the barrel toward you, in the direction of the arrow at the left in Figs. 1 and 10 the threaded sleeve 17, see Figs. 2 and 3, is fed to the left, causing a movement of the casting 3 on the casting 2 and separating the set of die members 27ª and 36ª from the corresponding die members 27 and 36. Such movement is graphically seen by examining the two different positions of the parts, in Figs. 1 and 3. The spring 16 is compressed but has no spring action on the sleeve.

The index 23 enables an operator or an attendant, when moving the dial barrel 20, to predeterminately move the die members 27ª and 36ª from and in relation to the die members 27 and 36 for the reception of articles or pieces of materials by each set of said die members. This predeterminate setting will be found particularly useful when butt-welding the ends of iron or steel wires, having gauges ranging, let us say, from nine (9) to twenty (20), respectively, and with each setting, the sets of dies are proportionately spaced from each other, whereby when the sets of dies 27 and 36, and 27ª and 36ª are opened to receive and have such wires secured therein, the end of each wire will extend beyond its set of die members a distance, preferably equal approximately to its diameter, their ends in abutting relation, see Fig. 3, and with the wires gripped so close to their point of fusion that bending of such wires during welding is prevented, as well as preventing irregular joints at the welding points. While I elect to show a "spacing" index for predeterminately moving one set of die members in relation to the other set and to show its usefulness when welding the abutting ends of iron or steel wires, I desire to point out that such "spacing" index may or may not be used, as desired, and it is not absolutely essential that a wire extend beyond its set of dies, a distance "equal approximately to its diameter".

It is understood how, by the operation of the rods 30 and 30ª the die members 36 and 36ª may be moved apart from their respective die members 27 and 27ª to allow for the placing and securing of the ends of separate articles or pieces of material therebetween for the purpose of butt-welding the ends of such materials, as is illustrated in Figs. 2 and 3.

While I have elected to show the present embodiment of the machine as being particularly useful for butt-welding, what may be termed the smaller gauges of wires, as, for instance gauges nine (9) to twenty (20), as indicated by the "spacing" index 23, it is to be understood, as well as emphasized, that this disclosure is illustrative only and is not to be considered in the limiting sense.

In the operation of the device, as for example, on wires, we will assume that the dial barrel 20 has been rotated to a selective position for the butt-welding of a wire of any of the gauges denoted by the "spacing" index 23 and two (2) wires gripped by the respective sets of dies 27 and 36, and $27^a$ and $36^a$, with the ends of the wires in abutting relation preparatory to their being butt-welded, the operator or attendant will then reverse the movement of the dial barrel 20 and rotate it away from him and in the direction of the arrow at the right hand side of the barrel, as shown in Figs. 1 and 10. Such rotation of the dial barrel will cause the threaded sleeve 17 to be moved axially on the stem 14 and away from the body of the shaft or spindle 7, and during such movement compress the spring 16 between the inner end of said sleeve and the head 15 on the end of the stem 14. Then on the application of a current of electricity and during fusion, the tension in the spring 16 will exert itself on the head 15 of the shaft or spindle 7 and move the said shaft or spindle and casting 3 and the set of die members $27^a$ and $36^a$ in the direction of the casting 2 and its die members 27 and 36 to insure an efficient butt-welding of the abutting ends of the two wires.

The index 24 for predeterminately determining the required "tension" in the spring 16, depending on the gauge of wires to be butt-welded, corresponds in designations to the designations of the "spacing" index. That is to say—the "tension" index is designated nine (9) to twenty (20) and the characters are placed on the dial-barrel at such predetermined points that whatever the selected "tension" position of the dial-barrel is, having in mind the gauge of the wires to be welded, the sleeve 17 will be operated to put into the spring 16 the "tension" necessary or required to cause an efficient welding of two wires, on the application of a current of electricity thereto. The setting of the dial barrel is caused by rotating it in either direction so as to position the corresponding designations of both indexes opposite the markers 0 and $0^1$ on the machine, as is best seen in Figs. 1 and 11.

The index 24, like the index 23, is illustrative and not to be considered in the limiting sense, as different gauges of wires other than those expressed will require a different "tension" and initially the machine and its respective elements are adjusted to meet conditions under which it must be operated.

The gripping faces of the die members 27 and $27^a$ are preferably serrated, as shown at 44, and such serrations, as best seen in Fig. 9, are graduated to size within certain limits with the largest serrations at preferably the upper ends of the dies and the smallest serrations at the lower ends of the dies, so that proper seats are provided to hold wires or other materials or shapes in firm position for the welding operation. The coacting die members 36 and $36^a$ are pivotally supported, as explained, so as to insure gripping the wires or other materials or shapes throughout the width of the die faces and the faces of said members 36 and $36^a$, next adjacent the members 27 and $27^a$ are inclined, as at 45, so as to accentuate the spacing between the members where the serrations are large and reduce such spacing where the serrations are small, and thus quickly adapt the dies to varying sizes and shapes of materials. The burrs formed at the joints of the articles or materials welded will vary in size with the different shapes or gauges of such materials. If it is wires being welded, the heavier the wires the thicker the burrs, as no doubt will be understood. Therefore, the adjacent side faces of the die members 27 and $27^a$ are beveled or inclined, as shown at 45, see particularly Figs. 7 and 8, to provide a substantially V-shaped separation to accommodate the different sizes of burrs on the different sizes of wires, resulting from the welding operation.

I provide in the housing 9, certain switch elements, the same being insulated from the casting by means of insulation 46. These elements comprise the limit switch 47 having a contact adapted for engagement with a similar contact on a member 48, the latter in circuit with a conductor $c$ including the primary coil $a$ from which conductors $d, e, f,$ and $g$ lead to contact points $k, i, j$ and $h$, respectively, of the control switch H, which is provided with a lever member B adapted to be successively brought into contact with the contact points $h, i, j$ and $k$. From the axis of the lever member B leads the line L1.

The limit switch 47 has a further contact point adapted for engagement with a similar contact point on a switch member 49 and said member so disposed as to be engaged by the manually operated push button 12 for bringing the contact of the member 49 into contact relation with the contact of the limit switch. From the member 49 leads the line L2.

The secondary coil $b$ is grounded at the support 1 for the machine and includes the conductor $l$ to the castings 3, as is best shown in Figs. 6 and 11.

On the setting of the "spacing" index 23, and materials to be welded being secured in the dies, the contact point 13 associated with the shaft or spindle 8 will have moved away from the limit switch 47, see Fig. 3, permitting it to have contact with the member 48. On the attendant then pushing the push button 12 inwardly, he will cause the member 49 to have contact with the limit switch 47. Then by throwing the lever member B of the control switch A into contact with the proper contact point $h$, $i$, $j$ or $k$, the circuit will be closed and cause a flow of current to fuse the abutting ends of the pieces of materials, resulting in the welding thereof, as has been previously explained.

At a moment preceding the completion of a weld, the contact point 13, under the action of the spring 16 will be brought into contact with the limit switch 47 and remove it from contact with the member 48 and open the circuit. The weld will then be completed under the action of the spring 16.

Various degrees of heat for use in welding varying gauges of the wires is made possible by the current control which I disclose. For instance the contact point $h$ would supply a low heat suitable for wires of eighteen (18) nineteen (19) and twenty (20) gauge; the contact point $i$ would supply a proportionally greater heat suitable for wires of fifteen (15), sixteen (16) and seventeen (17) gauge and the contacts $j$ and $k$ proportionally. $j$ for wires twelve (12), thirteen (13) and fourteen (14) gauge, and $k$ for wires of nine (9), ten (10) and eleven (11) gauge.

As will be understood, the push button 12 is the operating switch and the control lever B is the heat control switch.

The character of the electric equipment used is optional, and I have no desire to be limited to any particular character or kind of such equipment.

In Fig. 1 and in those figures which show component parts thereof to and including Fig. 11, I have shown the device in a form which shows the spacing index 23 as being associated with a dial barrel 20 on which is arranged the tension index 24, and while a spacing index is desirable in a machine of this character, whereby to predeterminately space the sets of dies apart for the gripping and welding of pieces of materials, it does not necessarily follow that such index is absolutely essential, and if desirable, essential in connection with the dial barrel 20. That is to say, the spacing of the sets of dies apart may be at the discretion of the operator or attendant who through sense of feel and observation may accomplish such setting through the actuation of the means which is employed for opening or moving apart the dies of each set; or if desired, such spacing index may be employed in immediate association with said means for opening the sets of dies, one for each or in association therewith and means as a distinct element, for separating the castings 2 and 3. The foregoing referred to mechanisms and means are shown in Figs. 12 to 15, both inclusive, as examples of modifications of such structure.

Figure 12:
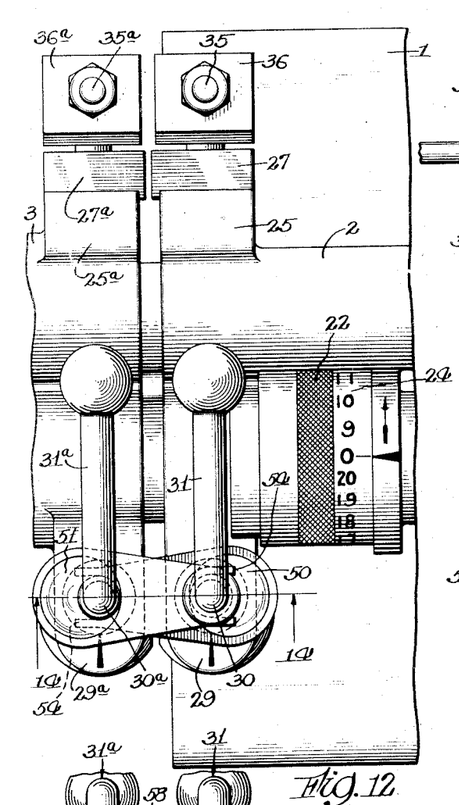
Fig. 12 is an enlarged detail in plan, showing one of the modified forms in which the means for spacing the sets of dies in their relation to each other, may be constructed, in which form the index for predeterminately spacing the sets of dies is removed from its relation in association with the tension setting index and may or may not be employed in connection with the means which is employed for moving one set of dies in relation to the other set, whereby to space them, and which is also used for opening the dies.
Figure 13:
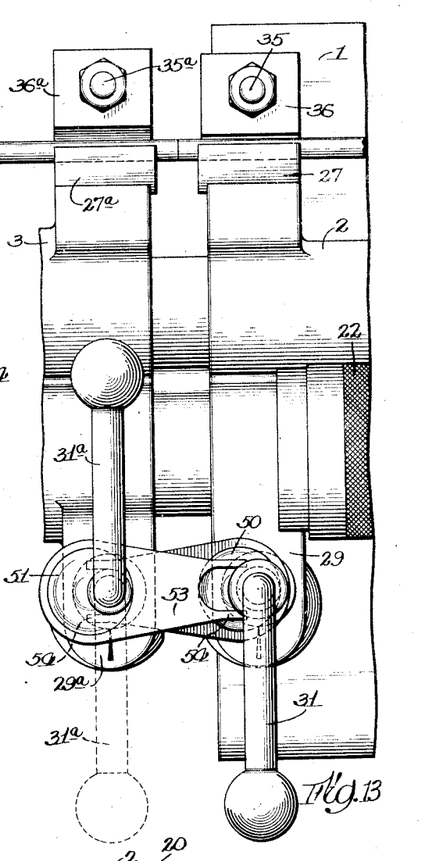
Fig. 13 is a view somewhat similar to Fig. 12, except that the means for spacing one set of dies in its relation to the other set and for opening the dies, is shown by full and dotted lines in different moved positions.
Figure 14:
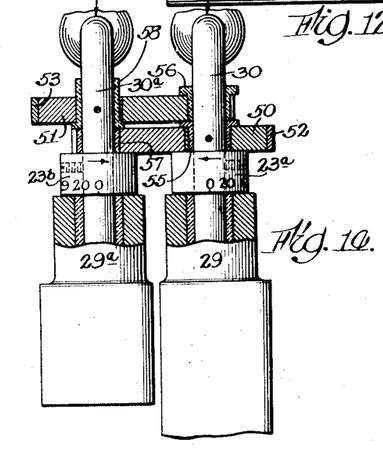
Fig. 14 is a sectional view as the same would appear if taken on the line 14—14, Fig. 12, and illustrates how a spacing indexing means may be used in this form of structure.

Referring to Figs. 12 to 14, both inclusive, I have shown the operator's rods 30 and 30ª connected respectively with eccentrics 50 and 51 in preferably superimposed relation, the latter being above the former and to the respective eccentrics are connected the eccentric straps 52 and 53, which at their ends opposite their eccentric members are formed or provided with similar bifurcated or slotted ends 54, adapted during rotation of their respective eccentrics to be moved toward and from the opposed operator's rod and to be guided, when reciprocated, in relation thereto. The eccentric 50 is connected to the operator's rod 30 through the interposition of a bushing 55, see Fig. 14, which is in the form of a flanged collar and located immediately thereabove is a flanged collar 56 with which the slotted or bifurcated end 54 of the strap 53 coacts, as shown. The end of the strap 52 which is associated with the eccentric 50 has a coacting relation with a collar 57 on the operator's rod 30ª and immediately thereabove on said rod is a flanged collar 58 through which is secured the eccentric 51 to the operator's rod 30ª.

It is designed through this arrangement of eccentrics and eccentric straps that an operator or attendant gripping and throwing the finger grips 31 and 31ª to separate the sets of dies to receive the materials to be welded that the castings 2 and 3 carrying said sets of dies may be spaced apart a proper or desired distance for the proper and efficient butt-welding of the pieces of material secured within the sets of dies.

In Fig. 12 the operator's rods 30 and 30ª are shown in position with the sets of dies opened. To space the castings 2 and 3 and their sets of dies apart, as for example, as shown in Fig. 13, the operator will move the finger hold 31ª from the full line position in Figs. 12 and 13 to the dotted line position in Fig. 13. This operation will cause the eccentric 51 to rotate in its strap inasmuch as the opposite end of the strap has a bearing relation against the operator's rod 30 and cause a movement of the casting 3 with its set of die members away from the casting 2 and its set of die members in view of the fact that the casting 2 has a fixed position, as shown in Fig. 13. When the elements are in this position, a piece of material which is to be welded is placed between the die members 27 and 36 and the finger hold 31 moved from the full line position shown in Fig. 12 to the full line position shown in Fig. 13 which will permit the die members 27 and 36, under the spring action referred to, to close upon and grip the material. Moving the finger hold 31 in the manner last mentioned will actuate the operator's rod 30 so as to rotate the eccentric 50 and move its strap 52 towards and transverse of the axis of the operator's rod 30ª and thereby lock the casting 3 against movement toward the casting 2, when the finger hold 31ª may be returned from its dotted line position in Fig. 13 to the full line position in said figure, whereby to open the die members 27ª and 36ª to permit the placement of the piece of material to be welded and to place it in abutting position with the piece of material secured in the die members 27 and 36. Upon so placing the materials the finger hold 31ª in Fig. 13 is returned to the dotted line position shown in said figure, when the steps of welding may be carried on and the tension in the spring which is employed to move the casting 3 toward the casting 2 may be applied, as previously described for the effective butt-welding of the material held by the sets of dies.

From the foregoing, it will be observed that the operator may space the sets of dies and permit the dies to be closed without a spacing index of the character which has been referred to as 23 and he can rely on his sense of feel and observation or determine the maximum extent of the spacing of the castings 2 and 3 by the extent of throws which it is possible to obtain by means of the eccentrics herein last above described. However, if it is desired, and it may be in certain instances, there may be provided spacing indexes 23ª and 23ᵇ exposed on the surface of corresponding collars which are secured to the respective operator's rods 30 and 30ª between the off-sets 29 and 29ª and the eccentric and its strap 52, see Fig. 14; the extent of rotation of the operator's rods 30 and 30ª may be determined by the movement of the indexes thereon in respect of the markers on the said off-sets, as shown in Fig. 12.

The spacing indexes 23ª and 23ᵇ, when used, will function in like manner as the spacing index 23 if and when it is determined to have a predeterminate spacing, by an index, of the sets of dies from each other and such modification in no wise affects or modifies the effective action of the tension index 24, which functions in each instance alike, and as has been previously explained.

The collars employed and shown in Fig. 14, in relation to the respective operator's rods and eccentrics and eccentric straps will, as is obvious, be of suitable material whereby to properly insulate these respective elements.

Figure 15:
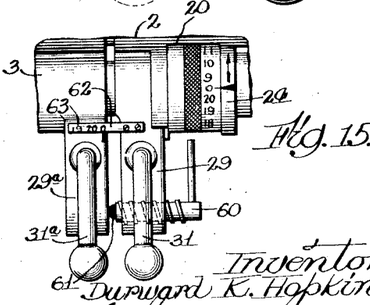
Fig. 15 is a detail in plan showing a further modification of an indexing means in association with a die moving means which is apart from and disassociated with the tension setting index.

In Fig. 15 I have shown a further modification of the means of spacing the sets of dies from each other. In this instance, the operator's rods and their respective finger holds are of like structure to that shown in Fig. 1 and the spacing index 23 is omitted from the dial barrel 20, the same as in Fig. 12. To space the casting 3 in its relation to the casting 2 which will also separate the sets of dies from each other, I provide a hand screw 60 threaded into the fixed off-set projection 29 of the casting 2 and provided with an insulation member 61 adapted to have an abutting or bearing relation against the off-set projection 29ª of the casting 3. It is obvious that on turning the hand screw in one direction the casting 3 may be moved or spaced apart from the casting 2 and after the dies have been opened and closed on pieces of materials to be welded, the hand screw will be threaded away from the movable off-set projection 29ª to allow the spring which has been set by the tension index to act during welding and in like manner as heretofore explained. The hand screw is a positive means for spacing and determining the desired separation of the castings from each other and such spacing will be at the option of the operator. If, however, a spacing index is desired in this modification, it may be in the form of the strap 62 secured to the off-set projection 29 to reach or lie across the off-set projection 29ª and provide on such strap an index 63, which will denote proper spacing in a manner which seems perfectly obvious, as the casting 3 is moved away from the casting 2.

I desire to point out, as should be obvious from the modified forms of structure which I have shown and described, that it is not essential nor in every instance will it be necessary or desirable to space the castings 2 and 3 and their respective sets of dies from each other a distance which shall be equal to the approximate diameter, gauge, width or thickness of the material being welded. This may be a desirable expedient to employ when welding iron or steel wires of certain diameters but with other materials it will probably not be found necessary or desirable and I, therefore, do not wish to be limited to any such application or use of the device.

It should be apparent from the foregoing reference to modified forms of structure and the adaptability of the device in its use for welding materials of different kinds and shapes that references to materials, as well as structure and modes of operation, are for purposes of illustration only and that I do not desire to be limited, either in scope or spirit, further than as expressed in the appended claims.

What I claim is:

1. In a machine for butt-welding metallic articles, in combination, sets of article gripping members, means to effect the movement of one set of members in selective spaced relation to the other set and to fixedly hold the same in such selective spaced relation during the securement of an article by a set of members, means for opening and closing each set of members, means to electrically energize said members, and means to effect movement of the movable set of members toward the other set during the fusing of the articles being welded.

2. In a machine for butt-welding metallic articles, in combination, sets of article gripping members, means to effect the movement of one set of members in selective spaced relation to the other set and to fixedly hold the same in such selective spaced relation during the securement of an article by a set of members, means for opening and closing each set of members, means to electrically energize said members, and spring means to effect movement of the movable set of members toward the other set during the fusing of the articles being welded.

3. In a machine for butt-welding metallic articles, in combination, sets of article gripping members, means to effect the movement of one set of members in selective spaced relation to the other set and to fixedly hold the same in such selective spaced relation during the securement of an article by a set of members, means for opening and closing each set of members, means to electrically energize said members, spring means to effect movement of the movable set of members toward the other set during the fusing of the articles being welded, and means to variably and predeterminately increase the tension in said spring.

4. In a machine for butt-welding metallic articles, in combination, sets of article gripping members, means to effect the movement of one set of members in spaced relation to the other set and to fixedly hold the same in such spaced relation during the securement of an article by a set of members, means for opening and closing each set of members, means to electrically energize said members, spring means to effect movement of the movable set of members toward the other set during the fusing of the articles being welded, and an indexing means operative to increase the tension in said spring.

5. In a machine for butt-welding metallic articles, in combination, sets of article gripping members, means to effect the movement of one set of members in spaced relation to the other set and to fixedly hold the same in such spaced relation during the securement of an article by a set of members, means for opening and closing each set of members, means to electrically energize said members, means to yieldably effect movement of the movable set of members toward the other set during the fusing of the articles being welded, and means to variably and predeterminately effect a change in pressure of said yieldable means.

6. In a machine for butt-welding metallic articles, in combination, sets of article gripping members, means to effect a variable and predeterminate spacing of one set of members in their relation to the other set, means for opening and closing each set of members whereby to receive and grip the articles to be welded, means to electrically energize said members, and means to effect movement of the movable set of members toward the other set during the fusing of the articles being welded.

7. In a machine for butt-welding metallic articles, in combination, sets of article gripping members, means to effect a variable and predeterminate spacing of one set of members in their relation to the other set, means for opening and closing each set of members whereby to receive and grip the articles to be welded, means to electrically energize said members, spring means to effect movement of the movable set of members toward the other set during the fusing of the articles being welded, and means to effect a variable and predeterminate tension in said spring.

8. In a machine for butt-welding metallic articles, in combination, sets of article gripping members, means to effect a predeterminate spacing of one set of members in their relation to the other set, means for opening and closing each set of members whereby to receive and grip the articles to be welded, means to electrically energize said members, means to yieldably effect movement of the movable set of members toward the other set during the fusing of the articles being welded, and means to effect a predeterminate change of pressure in said yieldable means.

9. In a machine for butt-welding metallic articles, in combination, sets of article gripping members, means to effect a predeterminate spacing of one set of members in their relation to the other set including a spacing index, means to positively open said members for article gripping, means to yieldably close the members on the articles, means to electrically energize said members, and means to effect movement of the movable set of members toward the other set during the fusing of the articles being welded.

10. In a machine for butt-welding metallic articles, in combination, sets of article gripping members, means to effect a predeterminate spacing of one set of members in their relation to the other set including a spacing index, means to positively open said members for article gripping, means to yieldably close the members on the articles, means to electrically energize said members, spring means to effect movement of the movable set of members toward the other set during the fusing of the articles being welded, and means to effect a predeterminate tension in said spring.

11. In a machine for butt-welding metallic articles, in combination, sets of article gripping members, means to effect a predeterminate spacing of one set of members in their relation to the other set including a spacing index, means to positively open said members for article gripping, means to yieldably close the members on the articles, means to electrically energize said members, means to yieldably effect movement of the movable set of members toward the other set during the fusing of the articles being welded, and means to effect a predeterminate change of pressure in said yieldable means.

12. In a machine for butt-welding metallic articles, in combination, a pair of castings supported in their relation to each other so that one is movable in relation to the other, a set of article gripping members on each casting, one member of each set being movable toward and from the other member, means to effect opening and closing of the sets of members, means to positively selectively space the movable casting with its set of members from the other casting and its members, means to electrically energize said members, and means to effect movement of said movable casting and its members toward the other casting and its members during the fusing of the articles being welded.

13. In a machine for butt-welding metallic articles, in combination, a pair of castings supported so that one is movable in relation to the other, a set of article gripping members on each casting, one member of each set being movable toward and from the other member, independent means to effect the opening and closing of each set of members, yieldable means in association with each set of members for closing the same, means to positively selectively space the movable casting with its set of members from the other casting and its members, means to electrically energize said members, and means to effect movement of said movable casting and its members toward the other casting and its members during the fusing of the articles being welded.

14. In a machine for butt-welding metallic articles, in combination, a pair of castings supported in their relation to each other so that one is movable in relation to the other, a set of article gripping members on each casting, one member of each set being movable toward and from the other member, means to effect opening and closing of the sets of members, means to predeterminately space the movable casting with its members from the other casting and its members including a spacing index, means to electrically energize said members, and spring means to cause movement of said movable casting and its members toward the other casting and its members during the fusing of the articles being welded, including a tension index.

15. In a machine for butt-welding ends of metallic articles, in combination, a pair of castings, one supported in movable relation to the other, a pair of article gripping dies connected with each casting and adapted for coaction in gripping the article to be welded, means for positively and selectively spacing the castings in relation to each other, manually operable means for opening each set of dies, spring means for closing the dies on the articles to be welded, and means to electrically energize said dies.

16. In a machine for butt-welding ends of metallic articles, in combination, a pair of castings, one supported in movable relation to the other, a pair of article gripping dies associated with each casting and adapted for coaction in gripping the articles to be welded, means to open and close each set of dies independently of the other set, means to positively and selectively space the movable casting, with its dies from the other casting and its dies, spring means to move the movable casting and its dies toward the other casting and its dies during the fusing of the articles being welded, means to selectively increase the tension in said spring, and means to electrically energize said dies.

17. In a machine of the character described, in combination, sets of article gripping dies, one die of each set movable in relation to the other, a support for each set of dies, one such support movable toward and selectively spacable from the other support, means to effect a variable and predeterminate spacing of said movable support from the other support, means on each support to open the dies, and other means on each support to close the dies.

18. In a machine for butt-welding ends of metallic articles, in combination, sets of article gripping dies, means to adjust one set of dies in relation to the other set including in association therewith, a means for predeterminately spacing said dies for certain articles, means for moving said adjusted set of dies toward the other set during the fusing of the ends of the articles, said die moving means under the control of and movable to operative position by said die adjusting means, and means for electrically energizing said dies.

19. In a machine for butt-welding ends of metallic articles, in combination, sets of article gripping dies, means to move one set of said dies in spaced relation to the other set, means for selectively spacing said sets of dies for certain articles, means for electrically energizing said dies, and means for moving said movable set of dies toward the other set during the fusing of the articles being welded.

20. In a machine for butt-welding ends of metallic articles, in combination, sets of article gripping dies, means to move one set of said dies in spaced relation to the other set, means for selectively spacing said sets of dies for certain articles, means for electrically energizing said dies, spring means for moving said movable set of dies toward the other set during the fusing of the articles being welded, and means for selectively tensioning of the spring when welding certain articles.

21. In a machine for butt-welding ends of wires, in combination, sets of wire gripping dies, means to space one set of dies in relation to the other set including an indexing means to effect a variable and predeterminate spacing of said dies for selective sizes of wires, and means for electrically energizing said dies.

22. In a machine for butt-welding ends of wires, in combination, sets of wire gripping dies, means to space one set of dies in relation to the other set including an indexing means to effect a variable and predeterminate spacing of said dies for selective sizes of wires, means for opening and closing each set of dies, and means for electrically energizing said dies.

23. In a machine for butt-welding ends of wires, in combination, sets of wire gripping dies, means to space one set of dies in relation to the other set including an indexing means to effect a variable and predeterminate spacing of said dies for selective sizes of wires, a separate but similar means in association with each set of dies for opening and closing the same, and means for electrically energizing said dies.

24. In a machine for butt-welding ends of wires, in combination, sets of wire gripping dies, means to space one set of dies in relation to the other set including an indexing means to effect a variable and predeterminate spacing of said dies for selective sizes of wire, means for moving said spaced set of dies toward the other set of dies during the fusing of the abutting ends of the wires, said die moving means under the control of said indexing means, and means for electrically energizing said dies.

25. In a machine for butt-welding ends of wires, in combination, sets of wire gripping dies, means to space one set of dies in relation to the other set including an indexing means to effect a variable and predeterminate spacing of said dies for selective sizes of wires, means for opening and closing each set of dies, a spring for moving said spaced set of dies toward the other set of dies during the fusing of the abutting ends of the wires, means operable by said die spacing means for putting said spring under tension and including an indexing means for predeterminately determining said tension in relation to the selective sizes of wires being welded, and means for electrically energizing said dies.

26. In a machine for butt-welding ends of wires, in combination, sets of wire gripping dies, means to space one set of dies in relation to the other set of dies including an indexing means to effect a variable and predeterminate spacing of said dies for selective sizes of wires, means for opening and closing each set of dies, a spring for moving said spaced set of dies toward the other set of dies during the fusing of the abutting ends of the wires, means operable by said die spacing means for putting said spring under tension and including an indexing means for predeterminately determining said tension in relation to the selective sizes of wires being welded, means for conducting a current of electricity to said dies to energize the same, and means for stopping the flow of said current just prior to the completion of the welding action and prior to the depletion of the tension in said spring.

27. In a machine for butt-welding ends of wires, in combination, sets of wire gripping dies, means to space one set of dies in relation to the other set including an indexing means to effect a variable and predeterminate spacing of said dies for selective sizes of wires, the matching faces of certain dies of each set being inclined to present a V-shaped space therebetween to provide for the reception of different sizes of burrs formed during the welding of different sizes of wires, means for opening and closing each set of dies, and means for electrically energizing said dies.

28. In a machine for butt-welding ends of wires, in combination, sets of wire gripping dies, means to space one set of dies in relation to the other set including an indexing means to effect a variable and predeterminate spacing of said dies for selective sizes of wire, the matching faces of certain dies of each set being inclined to present a V-shaped space therebetween to provide for the reception of different sizes of burrs formed during the welding of different sizes of wires, means for opening and closing each set of dies, means for moving said spaced set of dies toward the other set of dies during the fusing of the abutting ends of the wires, said die moving means under the control of said indexing means, and means for electrically energizing said dies.

29. In a machine for butt-welding ends of wires, in combination, sets of wire gripping dies, means to space one set of dies in relation to the other set including an indexing means to effect a variable and predeterminate spacing of said dies for selective sizes of wires, the matching faces of certain dies of each set being inclined to present a V-shaped space therebetween to provide for the reception of different sizes of burrs formed during the welding of different sizes of wires, means for opening and closing each set of dies, a spring for moving said spaced set of dies toward the other set of dies during the fusing of the abutting ends of the wires, means operable by said die spacing means for putting said spring under tension and including an indexing means for predeterminately determining said tension in relation to the selective sizes of wires being welded, and means for electrically energizing said dies.

30. In a machine for butt-welding ends of wires, in combination, sets of wire gripping dies, means to space one set of dies in relation to the other set of dies including an indexing means to effect a variable and predeterminate spacing of said dies for selective sizes of wires, the matching faces of certain dies of each set being inclined to present a V-shaped space therebetween to provide for the reception of different sizes of burrs formed during the welding of different sizes of wires, means for opening and closing each set of dies, a spring for moving said spaced set of dies toward the other set of dies during the fusing of the abutting ends of the wires, means operable by said die spacing means for putting said spring under tension and including an indexing means for predeterminately determining said tension in relation to the selective sizes of wires being welded, means for conducting a current of electricity to said dies to energize the same, and means for stopping the flow of said current just prior to the completion of the welding action and prior to the depletion of the tension in said spring.

31. In a machine for butt-welding ends of wires, in combination, sets of wire gripping dies, means to space one set of dies in relation to the other set including an indexing means to effect a variable and predeterminate spacing of said dies for selective sizes of wires, means for opening and closing each set of dies, corresponding dies of each set provided with graduated gripping portions for different sizes of wires, the other dies of each set being oscillatable in relation to their companion dies and the matching faces of certain of the dies of each set being inclined to present a V-shaped space therebetween to provide for the reception of different sizes of burrs formed during the welding of different sizes of wires, and means for electrically energizing said dies.

32. In a machine for butt-welding ends of wires, in combination, sets of wire gripping dies, means to space one set of dies in relation to the other set of dies including an indexing means to effect a variable and predeterminate spacing of said dies for selective sizes of wire, means for opening and closing each set of dies, a spring for moving aid spaced set of dies toward the other set of dies during the fusing of the abutting ends of the wires, means operable by said die spacing means for putting said spring under tension and including an indexing means for predeterminately determining said tension in relation to the selective sizes of wires being welded, and means for electrically energizing said dies.

33. In a machine for butt-welding ends of wires, in combination, sets of wire gripping dies, means to space one set of dies in relation to the other set of dies including an indexing means to effect a variable and predeterminate spacing of said dies for selective sizes of wire, means for opening and closing each set of dies, a spring for moving said spaced set of dies toward the other set of dies during the fusing of the abutting ends of the wires, means operable by said die spacing means for putting said spring under tension and including an indexing means for predeterminately determining said tension in relation to the selective sizes of wires being welded, means for conducting a current of electricity to said dies to energize the same, and means operative in conjunction with said spaced set of dies for stopping the flow of said current just prior to the completion of the welding action and prior to the depletion of the tension in said spring.

34. In a machine for butt-welding ends of wires, in combination, a set of castings slidable in relation to each other, a set of wire gripping die members carried by each casting, and a rotatable member for spacing said castings and the dies thereof in relation to each other including an indexing means to effect a variable and predeterminate spacing of said dies for selective sizes of wires, means for opening and closing each set of dies, and means for electrically energizing said dies.

35. In a machine for butt-welding ends of wires, in combination, a set of castings one slidable in relation to the other, a set of wire gripping die members carried by each casting, a rotatable member operatively connected with said slidable casting for spacing said casting and its set of dies in relation to the other casting and its set of dies including an indexing means to effect a variable and predeterminate spacing of said dies for selective sizes of wire, means for opening and closing each set of dies, means for automatically moving said slidable casting and its dies toward the other casting and its dies during the fusing of the abutting ends of the wires, said last mentioned means under the control of said rotatable member, and means for electrically energizing said dies.

36. In a machine for butt-welding ends of wires, in combination, a set of castings one slidable in relation to the other, a set of wire gripping die members carried by each casting, a rotatable member operatively connected with said slidable casting for spacing said casting and its set of dies in relation to the other casting and its set of dies including an indexing means thereon to effect a variable and predeterminate spacing of said dies for selective sizes of wire, means for opening and closing each set of dies, a spring for moving said slidable casting and its dies toward the other casting and its set of dies during the fusing of the abutting ends of the wires, means operative by said rotatable member for putting said spring under tension including a further indexing means thereon for predeterminately determining said tension in relation to the selective sizes of wires being welded, and means for electrically energizing said dies.

37. In a machine for butt-welding ends of wires, in combination, a set of castings one slidable in relation to the other, a set of wire gripping die members carried by each casting, a rotatable member operatively connected with said slidable casting for spacing said casting and its set of dies in relation to the other casting and its set of dies including an indexing means thereon to effect a variable and predetermined spacing of said dies for selective sizes of wire, means for opening and closing each set of dies, a spring for moving said slidable casting and its dies toward the other casting and its set of dies during the fusing of the abutting ends of the wires, means operative by said rotatable member for putting said spring under tension including a further indexing means thereon for predeterminately determining said tension in relation to the selective sizes of wires being welded, means for conducting a current of electricity to said dies to energize the same, and means operative under the influence of said slidable casting for stopping the flow of current just prior to the completion of the welding action and prior to the depletion of the tension in said spring.

38. In a machine for butt-welding ends of wires, in combination, a pair of castings one slidable in relation to the other, a pair of spaced shafts secured in said slidable casting and having axial movement in the other casting, a set of coactable dies on each casting, means to open and close each set of dies, means to space the slidable casting and its dies in relation to the other casting and its dies including a rotatable member in threaded engagement with means for positively moving said slidable casting in one direction and provided with an index for selectively spacing said slidable casting and its dies, a spring for moving said slidable casting and its dies toward the other casting and its dies during the fusing of the wires, said rotatable member being adapted during a reversal of its rotation to put tension into said spring, the said rotatable member having an additional index for determining the tension necessary in said spring for different sizes of wires, and means for electrically energizing said dies.

39. In a machine for butt-welding metallic articles, in combination, a pair of castings having a telescopic relation and adapted for movement one in relation to the other, a set of article gripping dies associated with each casting and arranged for coactive relation with articles to be welded, means on each casting for opening the respective sets of dies, means also on each casting for closing the respective dies on the articles to be welded, manually operable indexing means for spacing the castings and their dies in suitable selective spaced relation, yieldable means active to urge the movable casting and its dies toward the other casting and its dies during the fusing of the articles being welded, and means for electrically energizing said dies.

40. In a machine for butt-welding metallic articles, in combination, a pair of castings having a telescopic relation and adapted for movement one in relation to the other, a set of article gripping dies associated with each casting and arranged for coactive relation with articles to be welded, a lever means on each casting for opening the respective sets of dies, spring means on each casting for closing the respective sets of dies on the articles to be welded, means to effect spacing of the movable casting and its dies in suitable spaced relation to the other casting and its dies, a selective index to determine such spacing with respect to the welding of certain articles, spring means to urge the movable casting and its dies toward the other casting and its dies during the fusing of the articles being welded, a selective index to determine the tension in the spring with respect to the welding of certain articles, and means for electrically energizing said dies.

41. In a machine for butt-welding metallic articles, sets of article gripping dies wherein one die of each set is movable toward and from the other and wherein one set of dies is movable from and toward the other set, an oscillatable rod connected with one each of said sets of dies and operative to move the same to open position, a tension means operative to close such dies, and means operative by the said rods for effectively spacing the sets of dies from each other which comprises a corresponding means having connection with the respective rods and each arranged to have a bearing relation with the other rod.

42. In a machine for butt-welding metallic articles, sets of article gripping dies wherein one die of each set is movable toward and from the other and wherein one set of dies is movable from and toward the other set, an oscillatable rod connected with one each of said sets of dies and operative to move the same to open position, a tension means operative to close such dies, means operative by the said rods for effectively spacing the sets of dies from each other which comprises a corresponding means having connection with the respective rods and each capable of having a bearing relation with the other rod, and a spacing index connected with said rods for determinate spacing of said sets of dies.

43. In a machine for butt-welding metallic articles, sets of article gripping dies wherein one die of each set is movable toward and from the other and wherein one set of dies is movable from and toward the other set, an oscillatable rod connected with one each of said dies and operative to move the same to open position, a tension means operative to close such dies, means operative by the said rods for effectively spacing the sets of dies from each other which comprises a corresponding means having connection with the respective rods and each capable of having a bearing relation with the other rod, and spring means for moving the movable set of dies toward the other set during the fusing of the articles being welded.

44. In a machine for butt-welding metallic articles, sets of article gripping dies wherein one die of each set is movable toward and from the other and wherein one set of dies is movable from and toward the other set, an oscillatable rod connected with one each of said sets of dies and operative to move the same to open position, a tension means operative to close such dies, means operative by the said rods for effectively spacing the sets of dies from each other which comprises a corresponding means having connection with the respective rods and each capable of having a bearing relation with the other rod, spring means for moving the movable set of dies toward the other set during the fusing of the articles being welded, and a tension index for determinate tensioning of said spring.

45. In a machine for butt-welding metallic articles, sets of article gripping dies wherein one die of each set is movable toward and from the other and wherein one set of dies is movable from and toward the other set, an oscillatable rod connected with one each of said sets of dies and operative to move the same to open position, a tension means operative to close such dies, and means operative by said rods for effectively spacing the sets of dies from each other which comprises an eccentric member connected with each rod and a strap in association with each eccentric arranged to have a bearing relation with the other rod.

46. In a machine for butt-welding metallic articles, sets of article gripping dies wherein one die of each set is movable toward and from the other and wherein one set of dies is movable from and toward the other set, an oscillatable rod connected with one each of said sets of dies and operative to move the same to open position, a tension means operative to close such dies, means operative by said rods for effectively spacing the sets of dies from each other which comprises an eccentric member connected with each rod and a strap in association with each eccentric arranged to have a bearing relation with the other rod, and a spacing index connected with each rod for determinate spacing of said sets of dies.

47. In a machine for butt-welding metallic articles, sets of article gripping dies wherein one die of each set is movable toward and from the other and wherein one set of dies is movable from and toward the other set, an oscillatable rod connected with one each of said sets of dies and operative to move the same to open position, a tension means operative to close such dies, means operative by said rods for effectively spacing the sets of dies from each other which comprises an eccentric member connected with each rod and a strap in association with each eccentric arranged to have a bearing relation with the other rod, and spring means for moving the movable set of dies toward the other set during the fusing of the articles being welded.

48. In a machine for butt-welding metallic articles, sets of article gripping dies wherein one die of each set is movable toward and from the other and wherein one set of dies is movable from and toward the other set, an oscillatable rod connected with one each of said sets of dies and operative to move the same to open position, a tension means operative to close such dies, means operative by said rods for effectively spacing the sets of dies from each other which comprises an eccentric member connected with each rod and a strap in association with each eccentric arranged to have a bearing relation with the other rod, a spacing index connected with each rod for determinate spacing of said sets of dies, spring means for moving the movable set of dies toward the other set during the fusing of the articles being welded, and a tension index for determinate tensioning of said spring.

49. In a machine for butt-welding metallic articles, in combination, a fixed and a movable support, the latter adapted to be moved in spaced relation to the former, a set of article gripping dies on each support, means to open and close each set of dies, indexing means to positively move the movable support in selective spaced relation with the fixed support, and a yieldable means to move the movable support toward the fixed support during the fusing of the articles being welded.

50. In a machine for butt-welding metallic articles, in combination, a fixed and a movable support, the latter adapted to be moved in spaced relation to the former, a set of article gripping dies on each support, means to open and close each set of dies, means to positively move the movable support in spaced relation with the fixed support, a spacing index for determinate spacing of the supports, a spring means to move the movable support toward the fixed support during the fusing of the articles being welded, and a tension index for determinate tensioning of said spring means.

51. In a machine for butt-welding metallic articles, in combination, a fixed and a movable support, the latter adapted to be moved in spaced relation to the former, a set of article gripping dies on each support, means to open and close each set of dies, means to positively move the movable support in spaced relation with the fixed support comprising a member having a threaded engagement with one support and adapted to have a bearing relation against the other support, a spacing index for determinate spacing of the movable support, a spring means to move the movable support toward the fixed support during the fusing of the articles being welded, and a tension index for determinate tensioning of said spring means.

52. In a machine for butt-welding metallic articles, in combination, a set of article gripping members, means to effect the movement of one set of members in spaced relation to the other set, means for opening and closing each set of members, means to electrically energize said members, means to effect movement of the movable set of members toward the other set during the fusing of the articles being welded, and means for de-energizing said members just prior to the completion of the welding action.

53. In a machine for butt-welding metallic articles, in combination, a set of article gripping members, means to effect the movement of one set of members in spaced relation to the other set, means for opening and closing each set of members, means to electrically energize said members, means to effect movement of the movable set of members toward the other set, a spring means to effect movement of the movable set of members toward the other set during the fusing of the articles being welded, and means for de-energizing the said members just prior to the completion of the welding action and just prior to the moment said spring means becomes ineffective.

54. In a machine for butt-welding metallic articles, in combination, a set of article gripping members, means to effect the movement of one set of members in spaced relation to the other set, means for opening and closing each set of members, means to electrically energize said members, means to effect movement of the movable set of members toward the other set, a spring to effect movement of the movable set of members toward the other set during the fusing of the articles being welded, means for effecting predeterminate tensioning in the said spring, and means for de-energizing the members just prior to the completion of the welding action and prior to the depletion of the tension in said spring.

In witness whereof I have hereunto set my hand and affixed my seal, this 23rd day of December, 1930.

DURWARD K. HOPKINS.